(No Model.)
H. A. SHEPARD.
CLOTHES PRESS.
No. 511,097. Patented Dec. 19, 1893.
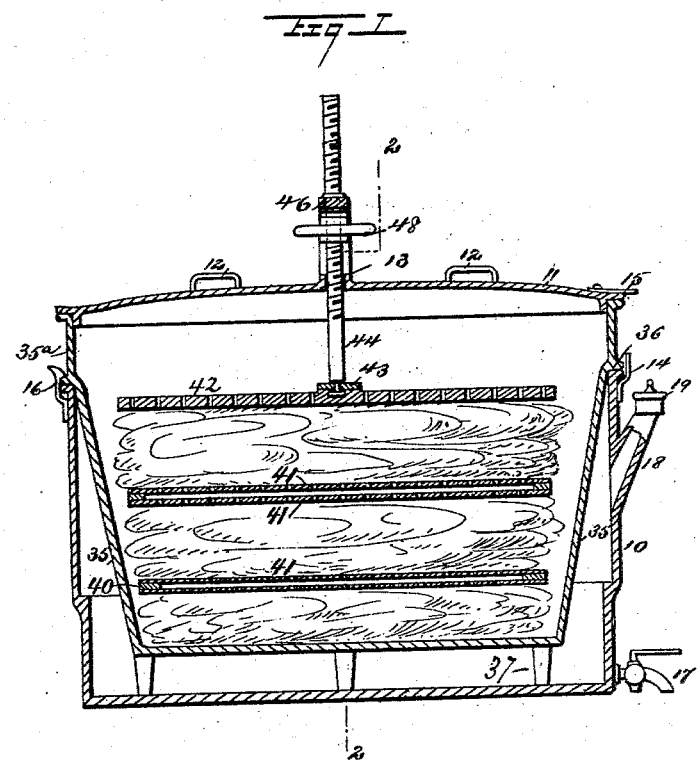
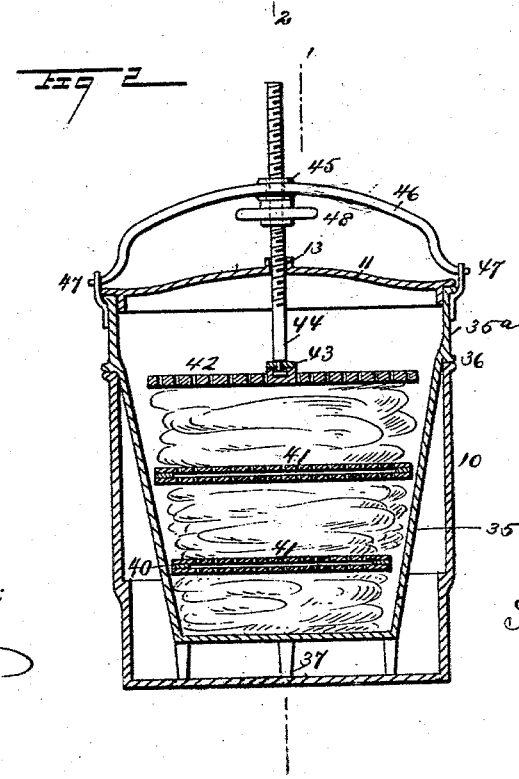
WITNESSES:
H. Walker
C. Sedgwick
INVENTOR
H. A. Shepard
BY Munn & Co.
ATTORNEYS.

UNITED STATES PATENT OFFICE.

HULDAH A. SHEPARD, OF NELSONVILLE, OHIO.

CLOTHES-PRESS.

SPECIFICATION forming part of Letters Patent No. 511,097, dated December 19, 1893.

Application filed January 29, 1892. Serial No. 419,678. (No model.)

*To all whom it may concern:*

Be it known that I, HULDAH A. SHEPARD, of Nelsonville, in the county of Athens and State of Ohio, have invented a new and Improved Clothes-Press, of which the following is a full, clear, and exact description.

My invention is an improved apparatus for pressing clothes to remove the moisture and which will also dry the clothes.

My invention consists in certain features of construction and combinations of parts, which will be hereinafter described and claimed.

Reference is to be had to the accompanying drawings, forming a part of this specification, in which similar figures of reference indicate corresponding parts in both the views.

Figure 1 is a vertical longitudinal section on line 1—1 Fig. 2. Fig. 2 is a transverse section on line 2—2— Fig. 1.

The main vessel 10, is shaped substantially like an ordinary wash boiler, being of an elongated form and having preferably a copper bottom, and the vessel is provided with a pan, which has a removable cover 11, which fits snugly in the top thereof and which has handles 12 to facilitate its easy manipulation. The cover has also a central perforation 13. Near the bottom of the vessel and at one end, is a faucet 17, through which the water may run off, and higher up on the vessel is a nozzle 18 through which steam may escape, and which may be closed when necessary by a cap 19. The pan 35 is placed within the main vessel, this pan being constructed so that there will be sufficient space between its bottom and the bottom of the main vessel to hold the necessary amount of water to generate steam for heating the said pan. The pan 35 has a tapering lower portion which enables the steam to rise well up around its sides so as to heat it thoroughly, and the upper portion 35ª of the pan is of the same cross section as the main vessel, the pan having at the junction of the tapering and straight portions, a shoulder 36, which is adapted to rest upon the upper edge of the main vessel, and the pressure of the spring 14 against one end of the pan and upon one side of the shoulder 36, holds the opposite side of the shoulder, that is, the shoulder at the opposite end of the pan, in engagement with the spring catch 16, as shown in Fig. 1. On the bottom of the pan are legs 37, which rest upon the bottom of the main vessel, and which serve to strengthen and support the pan.

I also provide a series of hollow partitions or spacers each comprising an outer framework 40, and upper and lower perforated plates 41 secured to the framework, this arrangement of the plates permitting what little steam escapes from the clothing to lodge between them, thus hastening the drying process. A press board 42 is also used, which press board is perforated to permit the ready escape of steam. On the upper side of the press board is a socket 43, into which is shouldered the lower end of a screw 44, which extends upward through the perforation 13 in the cover, and the perforated collar 45 in the bail 46, which bail is made strong, and is secured to ears 47 on the sides of the upper portion 33ª of pan 35. The screw is provided beneath the bail with a wheel-nut 48, which may be turned so as to force the press-board downward and when the apparatus is used for pressing and drying clothes, the clothes are folded and laid within the pan. The clothes to be treated are folded while wet and placed in the press as shown in the drawings where they will be dried and pressed perfectly smooth. It is specially adapted for laces, table linen, and bed linen and any kinds of clothing which are capable of being evenly folded. Double perforated hollow partitions or spacers are placed at intervals between layers of the clothes, the press board and cover are adjusted upon the pan, and then by turning the wheel nut 48, the press board may be forced downward so as to squeeze out the moisture from the clothes, and the heat applied from below will thoroughly dry them.

If desired the pan 35 and its attachments may be removed and the cover applied to the main vessel 10; the cover being provided at one end with a link or hasp 15 to engage the upper end of the spring 14 and the opposite end of the cover being engaged by the catch 16.

Having thus described my invention, I claim as new and desire to secure by Letters Patent—

1. A clothes drier comprising the outer water vessel 10, the inner tapering vessel 35 having supports engaging the bottom and upper edge of the vessel 10, the removable cover on the vessel 35, and having a central aperture 13, a bail mounted on the outer vessel and having a central bearing, a screw extending down through the bearing and through said central aperture, a follower on the lower end of the screw and a hand nut on the screw between the bail and the cover, substantially as set forth.

2. The combination with the outer and inner vessels 10, 35, the cover having a central aperture, of the bail 46 having a bearing 45, a screw extending down through the bearing and cover aperture into vessel 35 and there provided with a follower 42, a hand nut 48 on the screw between the bail and cover and the partitions or spacers each formed of a frame work 40 and upper and lower perforated plates 41, substantially as set forth.

HULDAH A. SHEPARD.

Witnesses:
 JAMES R. HICKMAN,
 DANIEL MARION LEWIS.